(12) United States Patent
Vedantham et al.

(10) Patent No.: US 8,717,959 B2
(45) Date of Patent: May 6, 2014

(54) ADVERTIZED POWER-SAVE MODES FOR DIFFERENT TRAFFIC CONDITIONS

(75) Inventors: Ramanuja Vedantham, Allen, TX (US); Xiaolin Lu, Plano, TX (US); Assaf Sellla, Rishpon (IL)

(73) Assignee: Texas Instruments Incorporated, Dallas, TX (US)

( * ) Notice: Subject to any disclaimer, the term of this patent is extended or adjusted under 35 U.S.C. 154(b) by 143 days.

(21) Appl. No.: 13/362,491

(22) Filed: Jan. 31, 2012

(65) Prior Publication Data

US 2012/0195227 A1    Aug. 2, 2012

Related U.S. Application Data

(60) Provisional application No. 61/438,076, filed on Jan. 31, 2011.

(51) Int. Cl.
  *H04B 1/16*    (2006.01)
  *G08C 17/00*    (2006.01)

(52) U.S. Cl.
  USPC ......... 370/311; 370/229; 370/468; 455/343.4

(58) Field of Classification Search
  USPC ................ 370/229, 230, 310, 312, 468; 455/343.1–343.5
  See application file for complete search history.

(56) References Cited

U.S. PATENT DOCUMENTS

2009/0300383 A1* 12/2009 Kaneko ................... 713/310
2010/0323647 A1* 12/2010 Ryu et al. ............... 455/127.5

OTHER PUBLICATIONS

"Wi-Fi Peer-to-Peer (P2P) Technical Specification Draft Version 1.14," Wi-Fi Alliance Technical Committee P2P Task Group, 153 pgs, Aug. 2010.*

* cited by examiner

*Primary Examiner* — Kerri Rose
(74) *Attorney, Agent, or Firm* — Steven A. Shaw; Wade James Brady, III; Frederick J. Telecky, Jr.

(57) ABSTRACT

In at least some embodiments, a wireless communication device includes a transceiver having control logic to detect traffic conditions for a communication group and to enter different power-save modes for different traffic conditions. The control logic is configured to advertize a first power-save mode to the communication group in response to a first detected traffic condition, to advertize a second power-save mode to the communication group in response to a second detected traffic condition, and to advertize a third power-save mode to the communication group in response to a third detected traffic condition.

15 Claims, 8 Drawing Sheets

ADVERTIZED POWER-SAVE MODES FOR DIFFERENT TRAFFIC CONDITIONS

CROSS-REFERENCE TO RELATED APPLICATIONS

The present application claims priority to U.S. Provisional Patent Application No. 61/438,076, filed on Jan. 31, 2011; which is hereby incorporated herein by reference.

BACKGROUND

With the development and adoption of wireless communication technologies, consumer and business products are becoming increasingly "unwired". For example, Wi-Fi Access Points (APs) and products that are Wi-Fi Certified® now reside in homes, businesses, and public locations. The vast number of Wi-Fi networks is a driving factor for increased penetration of Wi-Fi into consumer electronic (CE) devices and mobile handsets and the increasing adoption of Wi-Fi in devices beyond computers and APs enables new usage models for users. One usage model based on Wi-Fi adoption enables different consumer electronic devices to share, display, print, and synchronize content in an easy and convenient manner. These usage scenarios have driven the need for peer-to-peer connectivity.

In response to peer-to-peer usage models, a task group known as "Wi-Fi Alliance" is developing a new standard called Wi-Fi Direct (also known as Wi-Fi P2P) to allow CE devices and mobile handsets to connect to each other in an ad hoc and peer-to-peer (P2P) manner. The Wi-Fi Direct specification outlines the operations in a P2P group and specifies various rules and procedures for power-save operations at the group owner and the clients. In a legacy Wi-Fi architecture, the AP does not perform power-save operations, whereas in the P2P environment the P2P group owner is to have power consumption similar to that of the P2P clients. This requirement is based on the assumption that the P2P group owner is also a CE device or mobile handset that primarily runs on limited battery supply. Efforts to reduce power consumption for P2P group devices or other wireless communication devices are ongoing.

SUMMARY

The problems noted above are solved in large part by a wireless communication device comprising a transceiver having control logic to detect traffic conditions for a communication group and to enter different power-save modes for different traffic conditions. The control logic is configured to advertize a first power-save mode to the communication group in response to a first detected traffic condition, to advertize a second power-save mode to the communication group in response to a second detected traffic condition, and to advertize a third power-save mode to the communication group in response to a third detected traffic condition.

Further, in at least some embodiments, a method for a wireless communication device comprises detecting, by a transceiver, a traffic condition for a communication group. The method also comprises entering, by the transceiver, one of a plurality of different power-save modes based on the detected traffic condition. The method also comprises advertising, by the transceiver, power-save notifications to the communication group for each of the plurality of power-save modes that is entered, wherein the advertising of power-save notifications varies for each of the entered plurality of power-save modes.

Further, in at least some embodiments, a transceiver comprises control logic configured to detect traffic conditions for an established Wi-Fi Direct group. The control logic is configured to advertise to clients of the established Wi-Fi Direct group opportunistic power-save notifications and periodic notice of absence notifications based on the detected traffic conditions.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to power-save mechanisms for a wireless communication group. In at least some embodiments, the wireless communication group comprises a group owner and a plurality of clients, where the group owner advertizes different power-save modes to the clients. Accordingly, the different power-save modes are sometimes referred to herein as advertized doze operations. The different power-save modes may be related to different traffic conditions detected and served by the group owner. The traffic conditions may correspond to idle traffic, periodic traffic, bursty traffic, or mixed traffic. Each power-save mode may utilize a different set of notifications selected from interruptible periodic power-save notifications, interruptible non-periodic power-save notifications, and uninterruptible non-periodic power-save notifications. In at least some embodiments, the wireless communication group corresponds to a Wi-Fi Direct group. In such case, the interruptible periodic power-save notifications correspond to periodic notices of absence, the interruptible non-periodic power-save notifications correspond to opportunistic power-save notifications, and the uninterruptible non-periodic power-save notifications correspond to non-periodic notices of absence.

Figure 1:
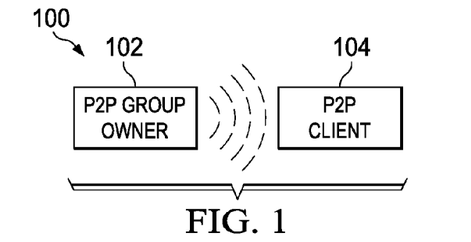
FIG. 1 shows a communication group in accordance with an embodiment of the disclosure.

FIG. 1 shows a communication group 100 in accordance with an embodiment of the disclosure. As shown, the communication group 100 comprises a peer-to-peer (P2P) group owner 102 in communication with a P2P client 104. For example, the P2P group 102 may be a cell phone or smart phone. Meanwhile, the P2P client 104 may be a printer. In different embodiments, other consumer electronic (CE) or mobile devices may operate as a group owner or client. In at least some embodiments, the P2P group owner 102 and the P2P client 104 operate as a W-Fi Direct P2P group. In a Wi-Fi Direct P2P group, the P2P group owner (GO) behaves similar to an access point (AP) and enables P2P clients to setup and communicate in a manner similar to a conventional AP. As AP functionality is mainly provided by software, this feature is referred to herein as Soft AP (SAP). Thus, in accordance with embodiments, the P2P group owner 102 employs SAP operations in conjunction with the advertized doze techniques described herein.

Figure 2:
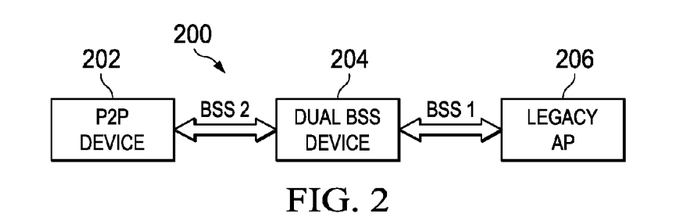
FIG. 2 shows concurrent operations of a communication group in accordance with an embodiment of the disclosure.

FIG. 2 shows concurrent operations of a communication group 200 in accordance with an embodiment of the disclosure. In FIG. 2, the concurrent operations are performed by a dual basic service set (BSS) device 204 that supports communications with a P2P device 202 and with a legacy AP device 206. As shown, the dual BSS device 204 communicates with the legacy AP device 206 using a first set of BSS operations (BSS 1) and communicates with the P2P device 202 using a second set of BSS operations (BSS2). In this manner, the duel BSS device 204 may operate as a client of legacy AP 206 and also operate as a group owner for P2P device 202. When operating as a group owner, the dual BSS device 204 may employ SAP operations in conjunction with the advertized doze techniques described herein.

Figure 3:
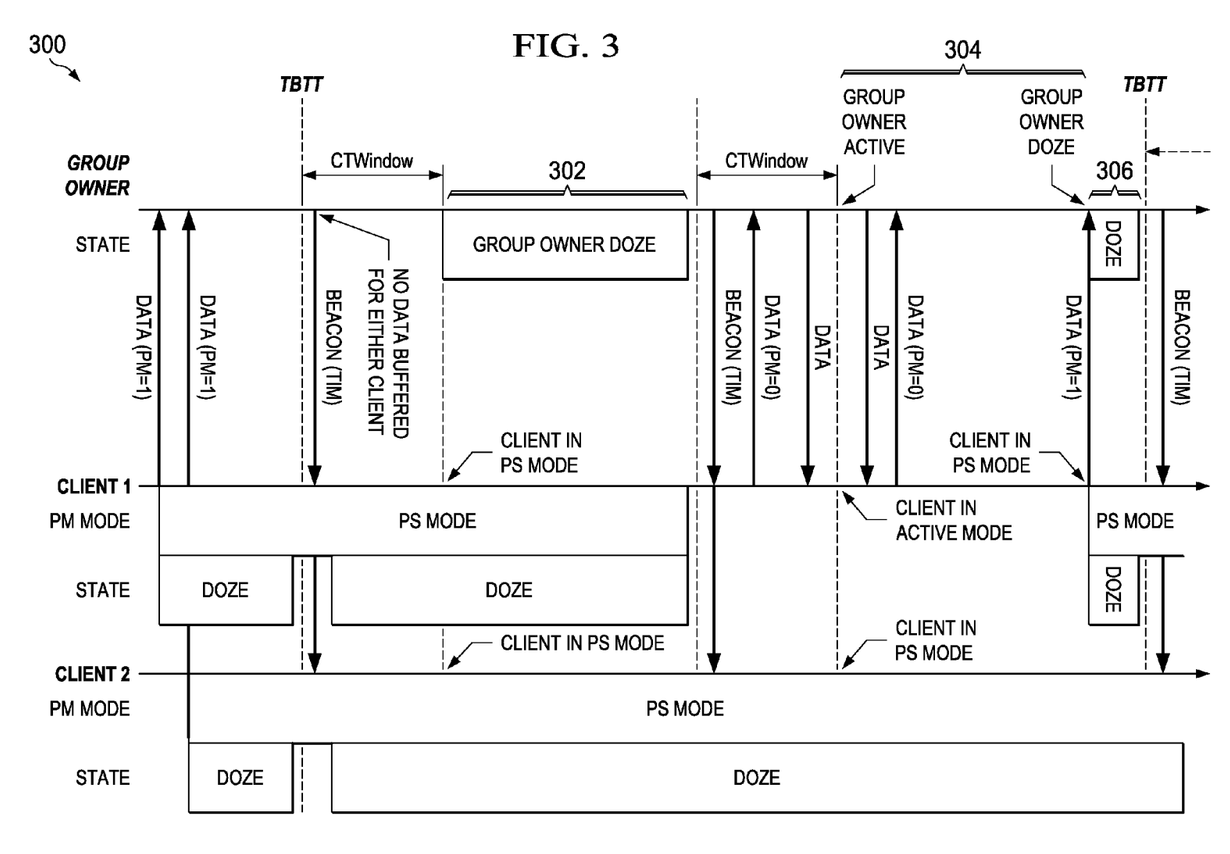
FIG. 3 shows an opportunistic power-save timing chart for a Wi-Fi Direct communication group in accordance with an embodiment of the disclosure.

FIG. 3 shows an opportunistic power-save timing chart 300 for a Wi-Fi Direct communication group in accordance with an embodiment of the disclosure. In the timing chart 300, the power management states of a group owner, a first client (client 1), and a second client (client 2) are shown. More specifically, the timing chart 300 shows that group owner is able to detect when both client 1 and client 2 are in a doze state. The detection of the doze state for the clients may be based on notification(s) and/or detecting that there is no data buffered for either client during a listening interval (e.g., the CTWindow) following a beacon transmission by the group owner. In response to detecting that both client 1 and client 2 are in a doze state, the group owner enters its own doze state 302 until a subsequent target beacon transmit time (TBTT) nears or is reached. If either the client 1 or the client 2 responds to the beacon by transmitting data during the listening interval, the group owner stays in an active state to enable communications with the clients. As long as one of the clients is transmitting data, the group owner stays active. For example, the timing chart 300 shows that client 1 responds to a beacon with data during the listening interval and thus the group owner stays in an active state 304 for a period of time. However, if data transfers from client 1 have not been received for more than a threshold period of time, the timing chart 300 shows group owner enters a doze state 306 for a brief amount of time until the subsequent TBTT nears of is reached.

The P2P group owner opportunistic power-save operations described for timing chart 300 is a power management scheme that allows a P2P group owner to gain additional power savings on an opportunistic basis. The opportunistic power save uses the CTWindow, which is the period the group owner shall stay awake after the start of TBTT, as a listening period. The Wi-Fi Direct specification recommends that this duration be at least 10 Transmission Units (TU), where a TU represents 1.024 ms, to allow for device discovery during that period. If all the P2P clients have their power mode (PM) set to 1 (active mode), they are required to have the traffic exchange completed within the CTWindow duration. The CTWindow advertisement and opportunistic power-save mechanism are advertized to P2P clients through a Notice of Action attribute in the beacons and probe responses so that the P2P clients are aware of the power-save mechanism being used. It should be noted that it may take a number of delivery traffic indication message (DTIM) intervals to successfully communicate new, updated or cancelled CTWindow timing to all P2P clients in a P2P croup. It should also be noted that the opportunistic power-save mechanism described herein works well with 802.11 power-save but cannot be actively used when Wi-Fi Multimedia power-save (WMM-PS) or unscheduled automatic power-save delivery (U-APSD) is used by P2P clients. If any of the clients are using the WMM-PS mechanism, a new message called the "presenceframe" is sent by the clients to the group owner. The presence frame is used to indicate to the group owner that the client is in active state of the WMM-PS mechanism causing the group owner to relinquish the opportunistic power-save mechanism.

After the CTWindow duration, the P2P group owner can enter the doze state if there are no ongoing transmissions. If there is an ongoing transmission, the active duration is extended until the completion of the packet transmission prior to entering the doze state.

Figure 4:
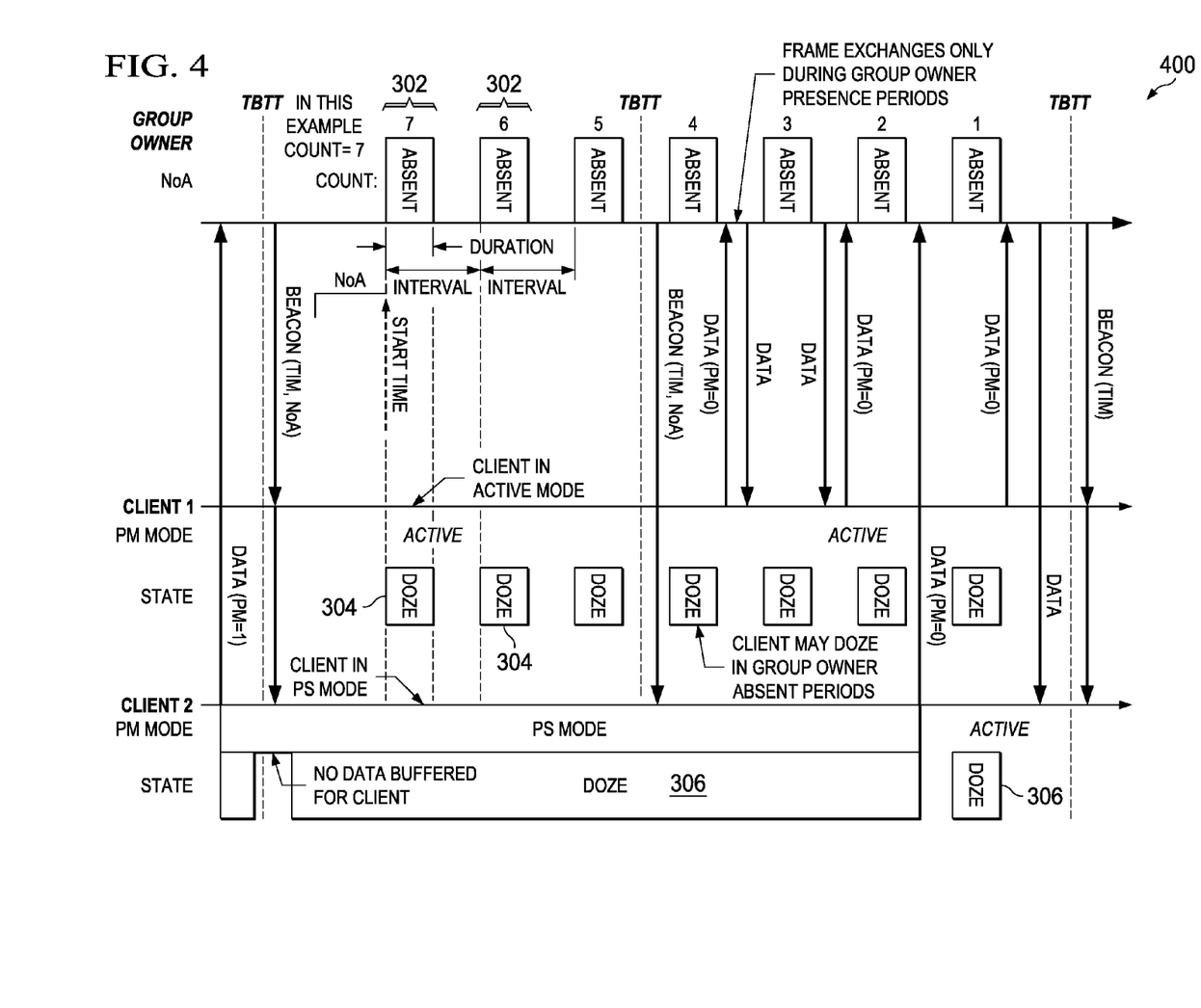
FIG. 4 shows a notice of absence power-save timing chart for a Wi-Fi Direct communication group in accordance with an embodiment of the disclosure.

FIG. 4 shows a notice of absence power-save timing chart 400 for a Wi-Fi Direct communication group in accordance with an embodiment of the disclosure. In the timing chart 400, the power management states of a group owner, a first client (client 1), and a second client (client 2) are shown. More specifically, the timing chart 400 shows that group owner is able to align its doze states 302 with the doze states 304 of client 1 and the doze states 306 of client 2. The alignment of the doze states 302, 304, and 306 is achieved by prior communications or programming between the group owner and the clients.

The Notice of Absence (NoA) mechanism described in timing chart 400 is used for scheduling periodic or planned periods of absence at the group owner within transmitted beacons and probe response frames. The exact periods of absence are pre-announced by the group owner through beacons, probe response or Notice of Absence Action Frames. There shall be no more that one Notice of Absence attribute in a beacon, probe response, or notice of absence action frame. However, there can be up to two different notice of absence schedules operating concurrently over a period of time.

The NoA at the group owner is indicated by a 4-tuple comprising of start time, interval, duration and count fields in the Notice of Absence attribute. The start time field indicates the start time of the timing schedule. The interval field shall indicate the absence interval. The duration field shall indicate the length of each absence. The count field shall indicate the number of absences. Note that the count field can take a value from 1-255, where the count value of 1 indicates a one-time Notice of Absence and where a value of 255 indicates unlimited periodic notice of absence with the periodicity matching the interval time. Any other count value is used to describe a finite periodic notice of absence schedule. In the timing chart 400, the Notice of Absence mechanism is employed for a Wi-Fi Direct P2P group. An additional rule governing the end of a Wi-Fi Multimedia (WMM) Unscheduled Service Period (USP) is applied if the P2P group owner is using Notice of Absence timing. That is, a USP shall end if a P2P group owner absence period occurs prior to signaling the end of the USP. When this occurs, the End of Service Period (EOSP) bit in the last frame delivered prior to the absence is 0 and the More bit is 1, indicating that buffered data remains at the P2P group owner.

The Wi-Fi Direct specification describes precedence rules when one or more of these power-save mechanisms are operating simultaneously. The order of precedence for P2P group owner power save states is as follows:

1. Highest: Absence due to a non-periodic Notice of Absence (Count=1);
2. Presence from TBTT until the end of beacon frame transmission;
3. Presence during the CTWindow; and
4. Lowest: Absence for a periodic Notice of Absence (Count>1).

These precedence rules mean that for any periodic NoA timing schedule (any NoA schedule where the count value is greater than 1), the P2P group owner is present for each TBTT to send a beacon frame independent of that Notice of Absence schedule. The precedence rules also mean that presence during the CTWindow takes priority over an absence period related to a periodic NoA schedule when both schemes are active.

Figure 5:
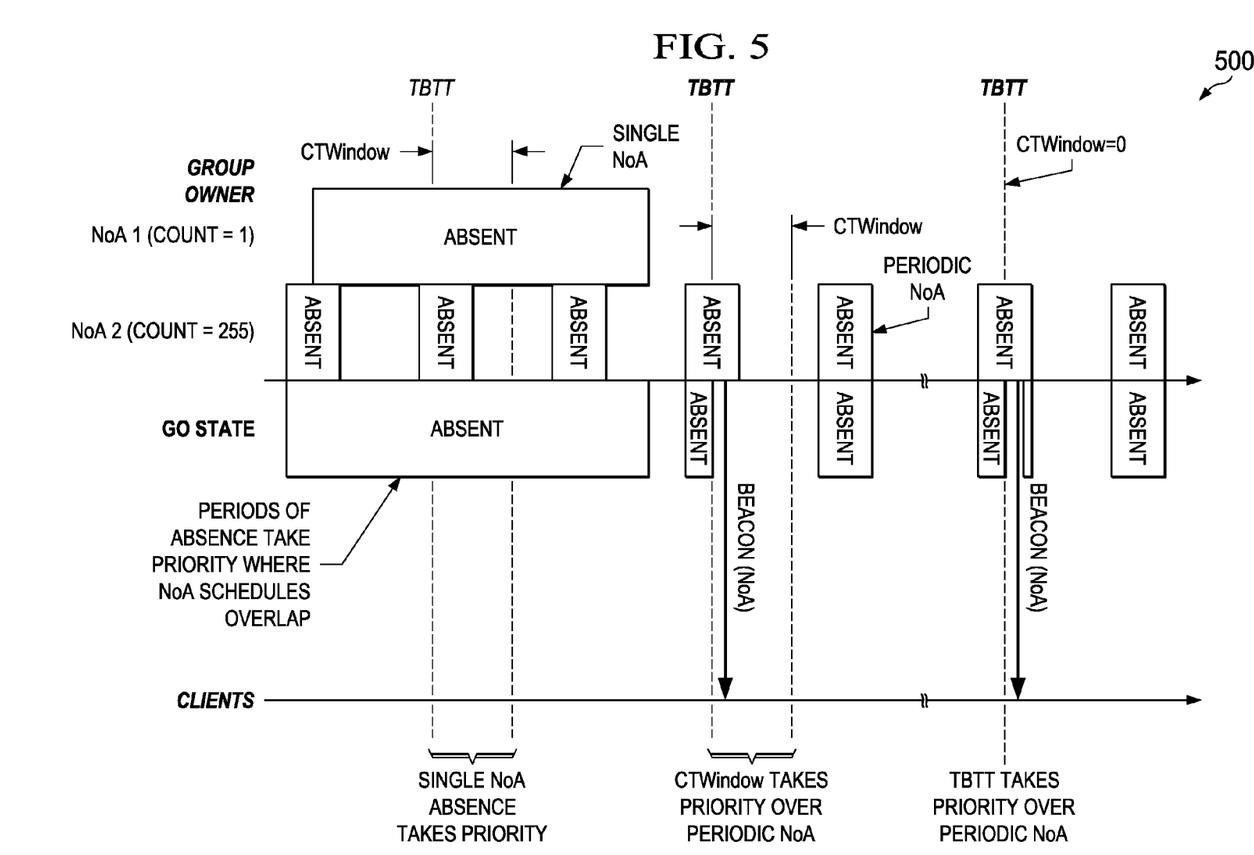
FIG. 5 shows a timing chart showing precedence rules for a Wi-Fi Direct communication group in accordance with an embodiment of the disclosure.

FIG. 5 shows a timing chart 500 showing precedence rules for a Wi-Fi Direct communication group in accordance with an embodiment of the disclosure. In timing chart 500, a non-periodic notice of absence takes priority of a periodic notice of absence. Further, a CTWindow takes priority over a periodic notice of absence. Further, a TBTT takes priority of a periodic notice of absence.

While use of opportunistic power-saves, periodic notices of absence, and non-periodic notices of absence are contemplated in the Wi-Fi Direct specification, the management scheme for these power-save options is not provided. Also, the scenarios and methodology for usage of multiple power-save options simultaneously is not given in the Wi-Fi Direct specification. As disclosed herein, a management scheme for power-save options, such as those described for the Wi-Fi Direct specification, is given. In at least some embodiments, the disclosed management scheme allows for implementation differentiation, while adhering to the rules and mechanisms specified in the Wi-Fi Direct specification.

Figure 6:
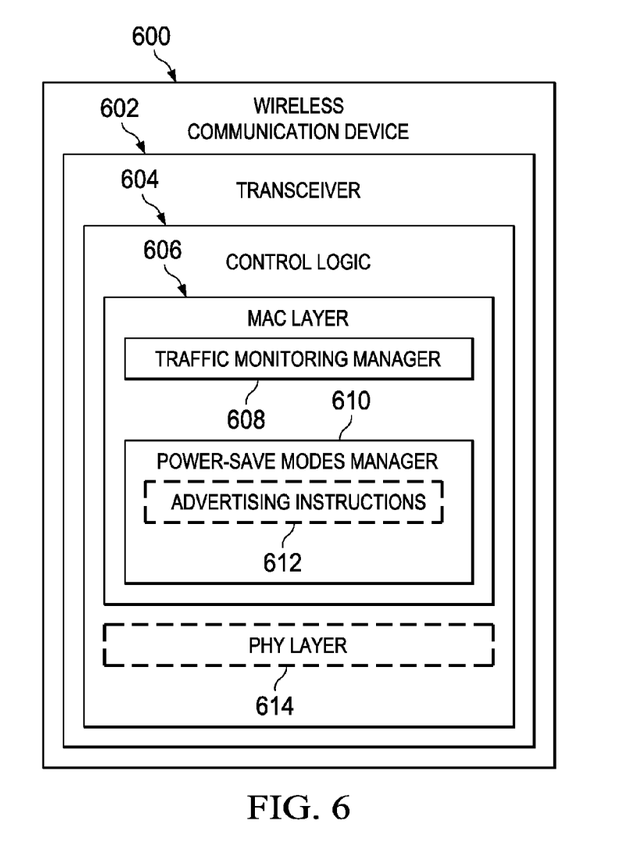
FIG. 6 shows a wireless communication device in accordance with an embodiment of the disclosure.

FIG. 6 shows a wireless communication device 600 in accordance with an embodiment of the disclosure. As shown, the wireless communication device 600 comprises a transceiver 602 with control logic 604 for performing the advertized doze operations described herein. In at least some embodiments, the control logic 604 comprises a media access control (MAC) layer 606 and a physical (PHY) layer 614, where the MAC layer 606 manages the advertized doze operations described herein. To perform the advertized doze operations, the MAC layer 606 comprises a traffic monitoring manager 608 and a power-save modes manager 610 with advertising instructions 612. The traffic monitoring manager 608 and the power-save modes manager 610 may correspond to software executable by a processor and/or programmable hardware. When performing the advertized doze operations, the wireless communication device 600 may operate as a group owner of a Wi-Fi Direct communication group.

In accordance with embodiments, the control logic 606 may employ the traffic monitoring manager 608 and the power-save modes manager 610 to detect traffic conditions for a communication group and to enter different power-save modes for different traffic conditions. As an example, the traffic monitoring manager 608 and the power-save modes manager 610 may cause the control logic 606 to advertize a first power-save mode to the communication group in response to a first detected traffic condition. The first detected traffic condition may be an idle load condition. In such case, the first power-save mode involves advertising a notification for a periodic power-save with a predetermined interval set to a beacon interval and an interval duration corresponding to an idle load condition.

As another example, the traffic monitoring manager 608 and the power-save modes manager 610 may cause the control logic 606 to advertize a second power-save mode to the communication group in response to a second detected traffic condition. The second detected traffic condition may be a bursty load condition. In such case, the second power-save mode involves advertising a notification for a periodic power-save having a predetermined period that is less than a beacon interval and having an interval duration corresponding to the bursty load condition.

As another example, the traffic monitoring manager 608 and the power-save modes manager 610 may cause the control logic 606 to advertize a third power-save mode to the communication group in response to a third detected traffic condition. The third detected traffic condition may be a periodic load condition. In such case, the third power-save mode involves advertising a notification for a periodic power-save having a predetermined period that is less than a beacon interval and having an interval duration corresponding to the periodic load condition.

As another example, the traffic monitoring manager 608 and the power-save modes manager 610 may cause the control logic 606 to advertize a fourth power-save mode to the communication group in response to a fourth detected traffic condition. The fourth detected traffic condition may be a mixed bursty and periodic load condition. In such case, the fourth power-save mode involves advertising a notification for a periodic power-save having a predetermined period that is less than a beacon interval and having an interval duration corresponding to the mixed bursty and periodic load condition.

In some embodiments, the first, second, third, and fourth power-save modes involve selectively advertising notifications for a periodic power-save, an interruptible non-periodic power-save, and an uninterruptible non-periodic power-save. The interruptible non-periodic power-save notification may be advertised, for example, during a beacon interval in addition to a periodic power-save notification based on an estimated load condition. Meanwhile, the uninterruptible non-periodic power-save notification is applied during a beacon interval in addition to a periodic power-save notification based on an estimated load condition and a low-battery condition. When the wireless communication device 600 operates as a group owner of a Wi-Fi Direct group, an opportunistic power-save notification and a periodic notice of absence notification are advertized differently for the different power-save modes. Further, non-periodic notice of absence notifications may replace opportunistic power-save notifications for different power-save modes during a low-battery condition.

Figure 7:
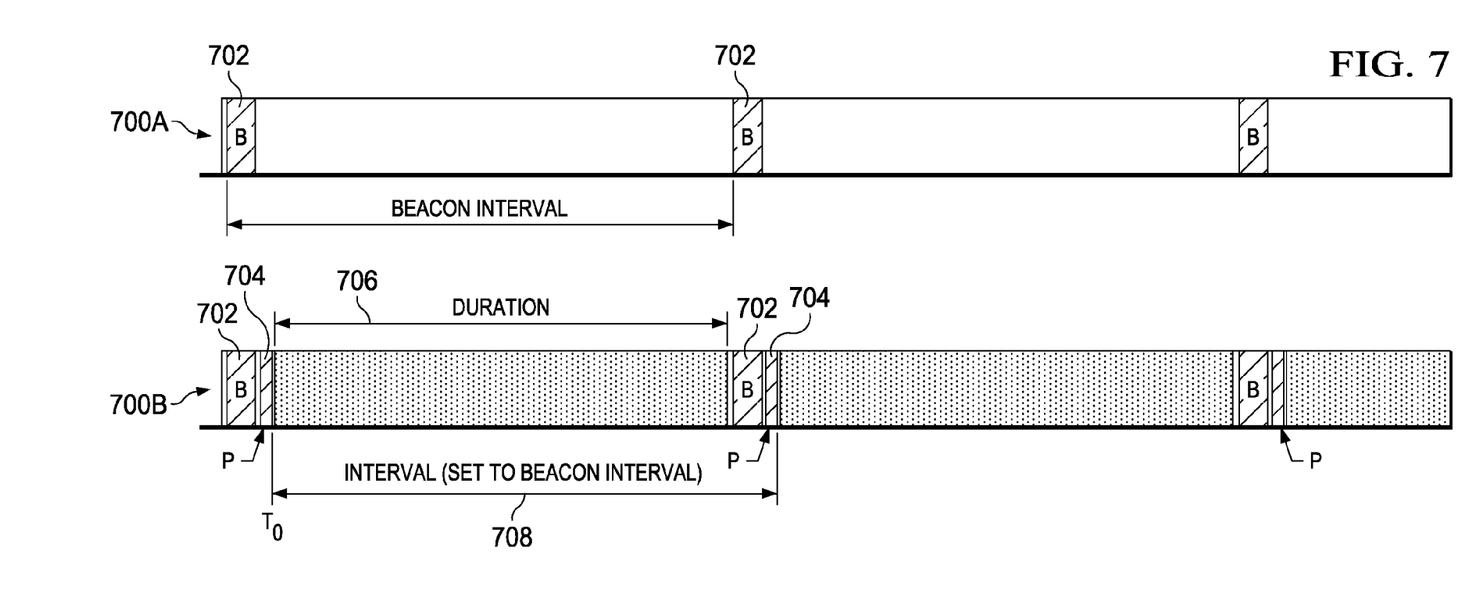
FIG. 7 shows timing charts related to an idle traffic power-save mode of a Wi-Fi Direct group owner in accordance with an embodiment of the disclosure.

FIG. 7 shows timing charts 700A and 700B related to an idle traffic power-save mode of a Wi-Fi Direct group owner in accordance with an embodiment of the disclosure. The timing chart 700A shows a baseline connection for an idle traffic condition, where beacons 702 are transmitted periodically and the group owner is active even though there is no traffic from clients.

In contrast, the timing chart 700B shows an advertized doze scheme for the same idle traffic condition. In timing chart 700B, periodic power-save notifications 704 (e.g., periodic notices of absence) are employed. As shown, the interval 708 related to the periodic power-save notifications 704 is set to the beacon interval and the power-save duration 706 (the doze state) extends from just after a periodic power-save notification 704 is transmitted to approximately the next beacon 702. In this manner, the group owner operates to maximize application of the doze state during an idle traffic condition. In at least some embodiments, the count field for the periodic notice of absence mechanism is set to 255, which causes the periodic power-save notification scheme of timing chart 700B to run indefinitely. However, it should be understood that an active client is able to interrupt the advertized doze scheme of timing chart 700B.

To summarize, for the idle traffic condition of timing charts 700A and 700B, the group owner is merely transmitting beacons to the associated P2P clients. In timing chart 700B, a periodic NoA scheme with sufficiently large interval (e.g., set to the beacon inter-arrival time) would be appropriate. This is because there is no active traffic and all the P2P clients (stations) associated with the group owner are cognizant of the power-save messages.

Figure 8:
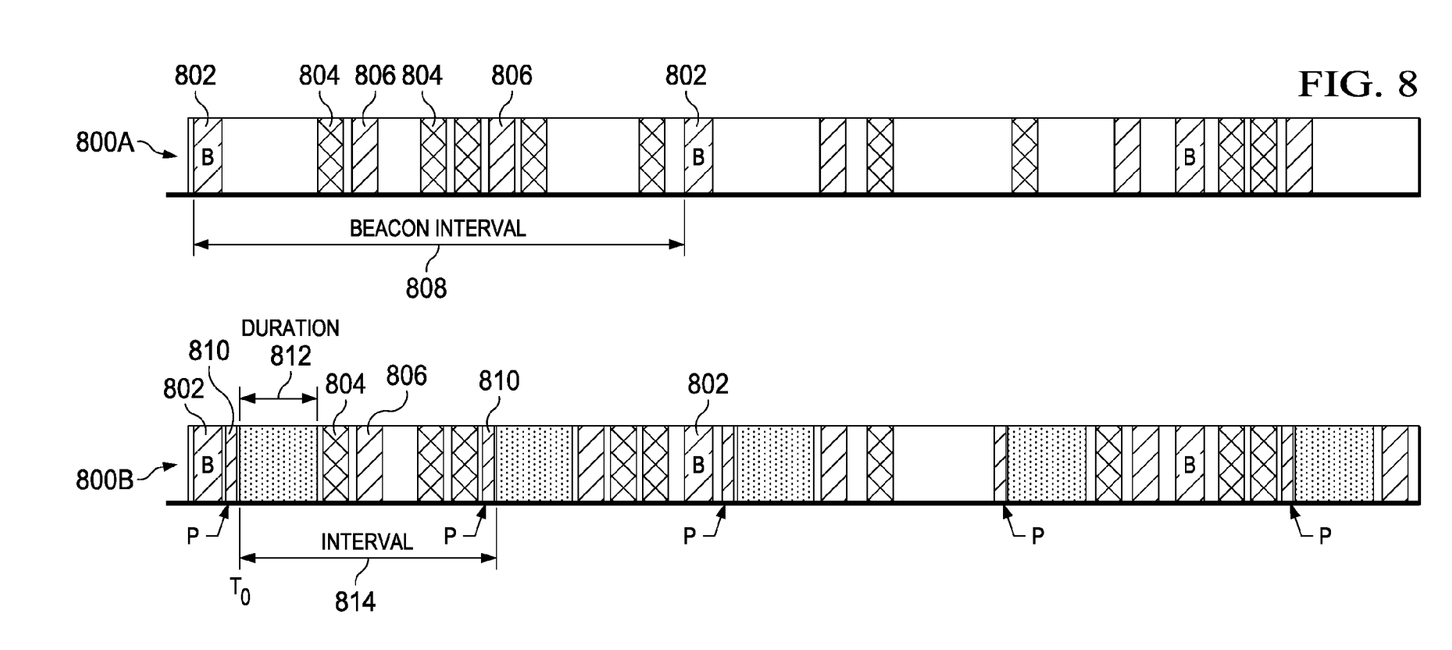
FIG. 8 shows timing charts related to a bursty traffic power-save mode of a Wi-Fi Direct group owner in accordance with an embodiment of the disclosure.

FIG. 8 shows timing charts 800A and 800B related to a bursty traffic power-save mode of a Wi-Fi Direct group owner in accordance with an embodiment of the disclosure. The timing chart 800A shows a baseline connection for a bursty traffic condition, where beacons 802 are transmitted periodically and the group owner is active to handle bursty communications for P2P clients.

In contrast, the timing chart 800B shows an advertized doze scheme for the same bursty traffic condition. In timing chart 800B, periodic power-save notifications 810 (e.g., periodic notices of absence) are employed. As shown, the interval 814 related to the periodic power-save notifications 810 is less than the beacon interval and the power-save duration 812 (the doze state) extends for a period corresponding to the bursty traffic condition. In this manner, the group owner operates to maximize application of the doze state for a bursty traffic condition. In at least some embodiments, the count field for the periodic notice of absence mechanism is set based on previously monitored traffic, which causes the periodic power-save notification scheme of timing chart 800B to run for a predetermined amount of time. However, it should be understood that an active client is able to interrupt the advertized doze scheme of timing chart 800B.

For the bursty traffic condition of timing charts 800A and 800B, the group owner may provision a new flow. In such case, the group owner needs to determine whether the flow is bursty and if so, the application load associated with it. This can sometimes be provided by a higher-layer control mechanism or may be determined using a learning algorithm. The determination of the load is beyond the scope of this disclosure. During the steady state for the bursty traffic, the load associated with it can be used to perform coarse-level traffic shaping and one-time (or possibly periodic) NoA frames can be transmitted during the idle-traffic periods. Also, the NoA scheme needs to provision for beacon transmissions when determining the start time to doze (and the duration).

Figure 9:
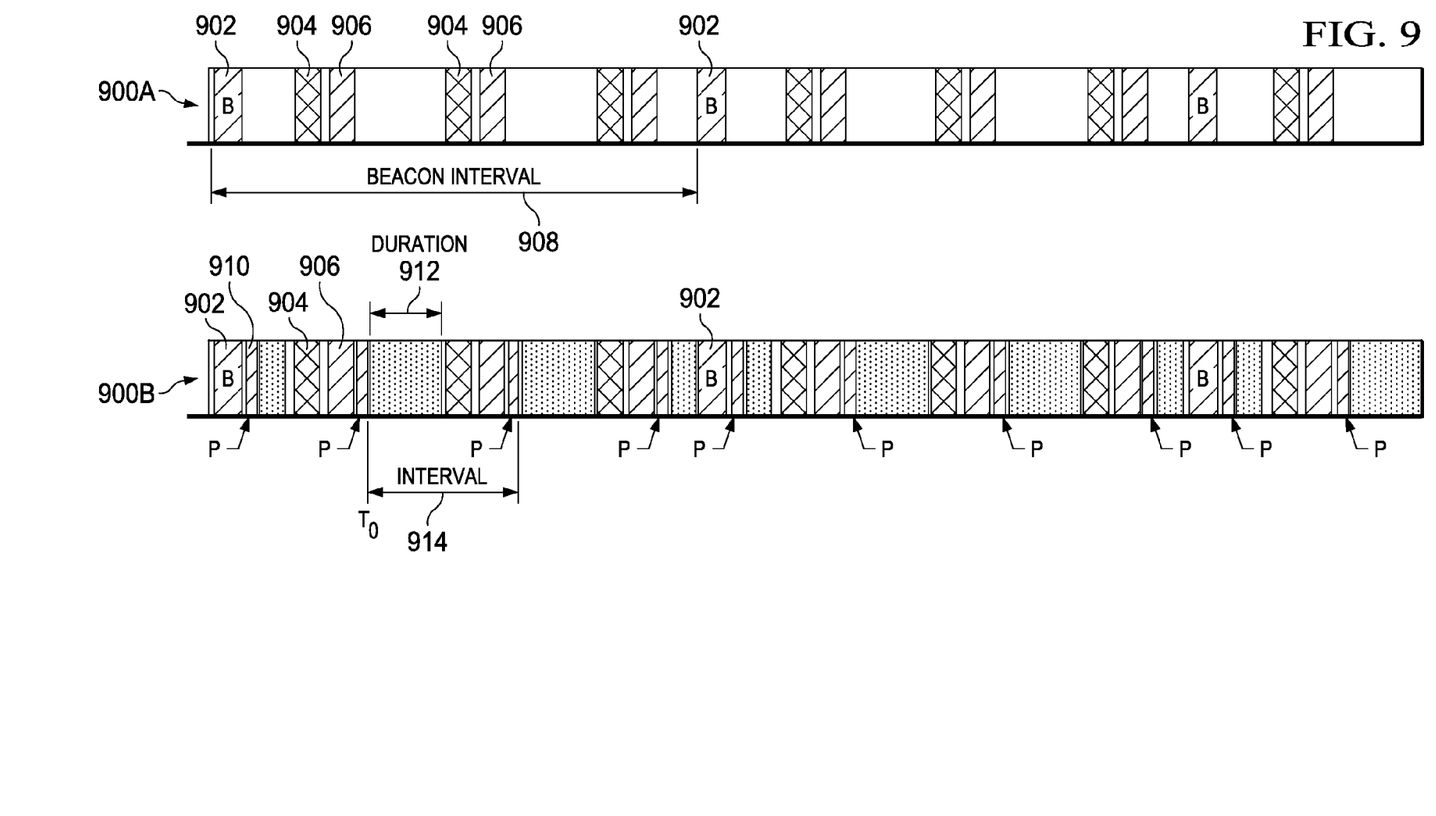
FIG. 9 shows timing charts related to a periodic traffic power-save mode of a Wi-Fi Direct group owner in accordance with an embodiment of the disclosure.

FIG. 9 shows timing charts 900A and 900B related to a periodic traffic power-save mode of a Wi-Fi Direct group owner in accordance with an embodiment of the disclosure. The timing chart 900A shows a baseline connection for a periodic traffic condition, where beacons 902 are transmitted periodically and the group owner is active to handle periodic communications for P2P clients.

In contrast, the timing chart 900B shows an advertized doze scheme for the same periodic traffic condition. In timing chart 900B, periodic power-save notifications 910 (e.g., periodic notices of absence) are employed. As shown, the interval 914 related to the periodic power-save notifications 910 is less than the beacon interval and the power-save duration 912 (the doze state) extends for a period corresponding to the periodic traffic condition. In this manner, the group owner operates to maximize application of the doze state for a periodic traffic condition. In at least some embodiments, the count field for the periodic notice of absence mechanism is set based on previously monitored traffic, which causes the periodic power-save notification scheme of timing chart 900B to run for a predetermined amount of time. However, it should be understood that an active client is able to interrupt the advertized doze scheme of timing chart 900B.

For the periodic traffic condition of timing charts 900A and 900B, the group owner may provision a new flow. In such case, the group owner needs to determine whether the new flow is periodic. If so, the group owner determines the minimum periodicity associated with it. This can be either provided by a higher-layer control mechanism (if this information is available), or may be determined using a learning scheme. The determination of the periodicity (if any) is beyond the scope of this disclosure. For periodic traffic, the group owner may employ periodic NoA with periodicity set to a value determined by the learning scheme. In the event beacons need to be provisioned, the group owner may use a one-time NoA to accommodate the beacon transmission.

For mixed (bursty and periodic) traffic conditions, the group owner may perform similar operations. A mixed traffic load will be considered to be a bursty type of traffic, where periodicity is also detected. As in the previous scenarios, the group owner needs to be aware of the load generated by the mixed traffic. Also, the group owner may utilize the one-time NoA scheme but ensure that the group owner does not set an interval greater than the periodicity associated with periodic traffic.

Without limitation to other embodiments, the proposed advertised doze scheme is fully compatible and compliant with the Wi-Fi P2P specification and specifies a management scheme for efficiently employing available power-save options for a group owner associated with P2P clients. The disclosed advertised doze scheme would require some minor changes to the firmware or the software of a group owner device. Further, the disclosed advertised doze scheme involves minimal state maintenance and chooses the power-save scheme based on the combined traffic served (i.e., the load and nature of served traffic). In accordance with embodiments, the disclosed advertised doze scheme attempts to maximize the power-savings for the group owner while not affecting the performance requirement of the various traffic types. The disclosed advertised doze scheme also indirectly enables power-savings at the clients by indicating periods of absence at the group owner. In other words, a client may choose to enter a doze state based on doze state notifications broadcast by the group owner. In particular, a client-side doze state may be performed in response to an uninterruptible doze advertized by the group owner. In accordance with embodiments, the disclosed advertised doze scheme involves minimal state maintenance and categorizes all the traffic conditions based on just two parameters—load and periodicity. For this reason, the algorithm is scalable to the typical scenarios for Wi-Fi Direct (up to 8 clients).

Figure 10:
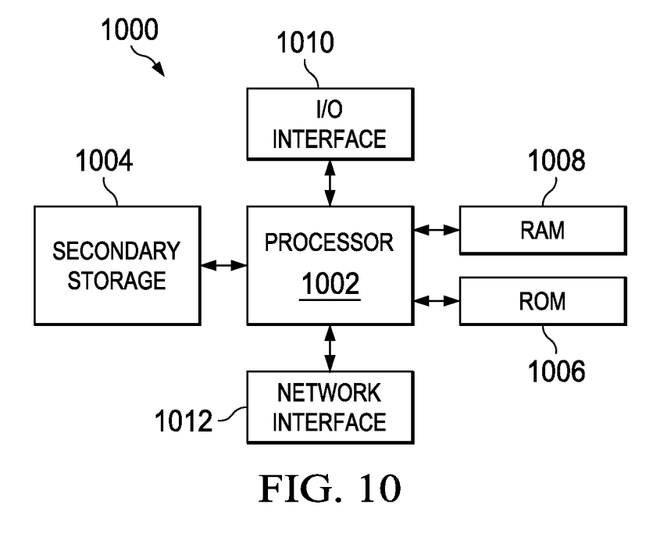
FIG. 10 shows an exemplary computer system suitable for implementing one or more embodiments of the disclosure.

FIG. 10 shows an exemplary computer system 1000 suitable for implementing one or more embodiments of the disclosure. The computer system 1000 may correspond to components of each communication device described herein, such as the group owner or clients of a communication group. As shown, the computer system 1000 includes a processor 1002 (which may be referred to as a central processor unit or CPU) that is in communication with memory devices including secondary storage 1004, read only memory (ROM) 1006, and random access memory (RAM) 1008. The processor 1002 is also in communication with input/output (I/O) devices 1010, and a network interface 1012. The processor 1002 may be implemented as one or more CPU chips.

It is understood that by programming and/or loading executable instructions onto the computer system 1000, at least one of the CPU 1002, the RAM 1008, and the ROM 1006 are changed, transforming the computer system 1000 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs which are loaded into RAM 1008 when such programs are selected for execution. The ROM 1006 is used to store instructions and perhaps data which are read during program execution. ROM 1006 is a non-volatile memory device which typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004. The secondary storage 1004, the RAM 1008, and/or the ROM 1006 may be referred to in some contexts as computer readable storage media and/or non-transitory computer-readable media.

I/O devices 1010 may include printers, video monitors, liquid crystal displays (LCDs), touch screen displays, keyboards, keypads, switches, dials, mice, track balls, voice recognizers, card readers, paper tape readers, or other well-known input devices.

The network interface 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network interface 1012 may enable the processor 1002 to communicate with the Internet or one or more intranets. With such a network connection, it is contemplated that the processor 1002 might receive information from the network, or might output information to the network in the course of performing the above-described method steps. Such information, which is often represented as a sequence of instructions to be executed using processor 1002, may be received from and outputted to the network, for example, in the form of a computer data signal embodied in a carrier wave.

Such information, which may include data or instructions to be executed using processor 1002 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1002 executes instructions, codes, computer programs, scripts which it accesses from hard disk, floppy disk, optical disk (these various disk based systems may all be considered secondary storage 1004), ROM 1006, RAM 1008, or the network interface 1012. While only one processor 1002 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1004, for example, hard drives, floppy disks, optical disks, and/or other device, the ROM 1006, and/or the RAM 1008 may be referred to in some contexts as non-transitory instructions and/or non-transitory information.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1000, at least portions of the contents of the computer program product to the secondary storage 1004, to the ROM 1006, to the RAM 1008, and/or to other non-volatile memory and volatile memory of the computer system 1000. The processor 1002 may process the executable instructions and/or data structures in part by directly accessing the computer program product, for example by reading from a CD-ROM disk inserted into a disk drive peripheral of the computer system 1000. Alternatively, the processor 1002 may process the executable instructions and/or data structures by remotely accessing the computer program product, for example by downloading the executable instructions and/or data structures from a remote server through the network interface 1012. The computer program product may comprise instructions that promote the loading and/or copying of data, data structures, files, and/or executable instructions to the secondary storage 1004, to the ROM 1006, to the RAM 1008, and/or to other non-volatile memory and volatile memory of the computer system 1000.

In some contexts, the secondary storage 1004, the ROM 1006, and the RAM 1008 may be referred to as a non-transitory computer readable medium or a computer readable storage media. A dynamic RAM embodiment of the RAM 1008, likewise, may be referred to as a non-transitory computer readable medium in that while the dynamic RAM receives electrical power and is operated in accordance with its design, for example during a period of time during which the computer 1000 is turned on and operational, the dynamic RAM stores information that is written to it. Similarly, the processor 1002 may comprise an internal RAM, an internal ROM, a cache memory, and/or other internal non-transitory storage blocks, sections, or components that may be referred to in some contexts as non-transitory computer readable media or computer readable storage media.

In at least some embodiments, a non-transitory computer-readable medium, such as those mentioned above, may store control logic or instructions that, when executed, causes the processor 1002 to perform various advertized doze operations. In some embodiments, the control logic may be part of a transceiver and may correspond to MAC layer instructions. As an example, the control logic, when executed, may cause the processor 1002 to detect traffic conditions for an established Wi-Fi Direct group. The control logic, when executed, also may cause the processor 1002 to advertise to clients of the established Wi-Fi Direct group opportunistic power-save notifications and periodic notice of absence notifications based on the detected traffic conditions.

The control logic, when executed, also may cause the processor 1002 to set a periodic interval for advertising periodic notice of absence notifications based on a beacon interval and to set a power-save duration for each periodic notice of absence based on an idle load condition. The control logic, when executed, also may cause the processor 1002 to set a periodic interval for advertising periodic notice of absence notifications at less than a beacon interval and to set a power-save duration for each periodic notice of absence based on at least one of a bursty load condition and a periodic condition. The control logic, when executed, also may cause the processor 1002 to advertise opportunistic power-save notifications in addition to periodic power-save notifications during a bursty traffic power-save mode or a periodic traffic power-save mode based on load conditions and to replace opportunistic power-save notifications with non-periodic notice of absence notifications based on a low-battery condition.

Figure 11:
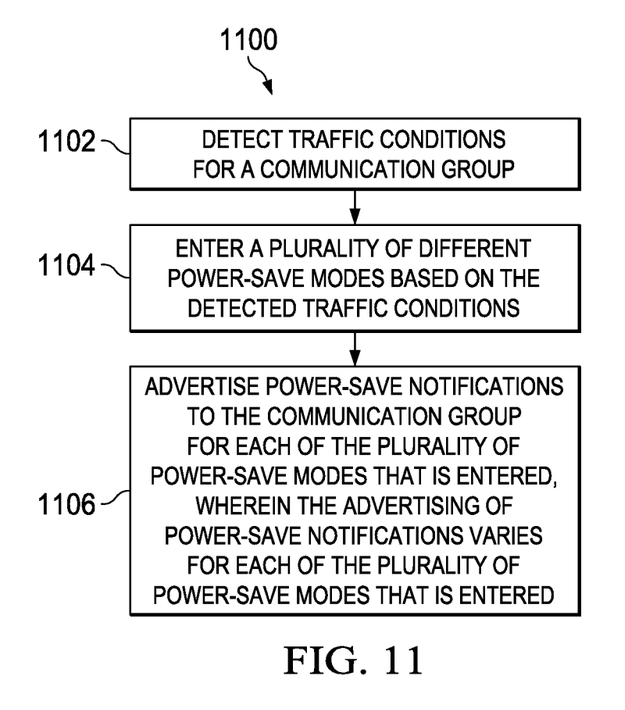
FIG. 11 shows a method in accordance with an embodiment of the disclosure.

FIG. 11 shows a method 1100 in accordance with an embodiment of the disclosure. The method 1100 may be performed, for example, by a transceiver of a group owner of a communication group. As shown, the method 1100 comprises detecting a traffic condition for a communication group (block 1102). The method 1100 also may comprise entering a plurality of different power-save modes based on the detected traffic condition. Finally, the method 1100 may comprise advertising power-save notifications to the communication group for each of the plurality of power-save modes that is entered, wherein the advertising of power-save notifications varies for each of the entered plurality of power-save modes (block 1106).

The method 1100 may comprise additional or alternative steps. For example, the method 1100 may additionally comprise setting a periodic interval for advertising power-save notifications associated with an idle traffic mode based on a beacon interval and setting a power-save duration for each advertised notification of the idle traffic mode based on an idle load condition. Further, the method 1100 may additionally comprise setting a periodic interval for advertising power-save notifications associated with a bursty traffic mode at less than a beacon interval and setting a power-save duration for each advertised notification of the bursty traffic mode based on a bursty load condition. Further, the method 1100 may additionally comprise setting a periodic interval for advertising power-save notifications associated with a periodic traffic mode at less than a beacon interval and setting a power-save duration for each advertised notification of the periodic traffic mode based on a periodic load condition. Further, the method 1100 may additionally comprise setting a periodic interval for advertising power-save notifications associated with a mixed bursty and periodic traffic mode at less than a beacon interval and setting a power-save duration for each advertised notification of the mixed bursty and periodic traffic mode based on a mixed bursty and periodic load condition. Further, the method 1100 may additionally comprise selectively adding at least one interruptible non-periodic power-save notification in addition to a periodic power-save notification for each of the plurality of power-save modes that is entered based on a load condition. Further, the method 1100 may additionally comprise selectively adding at least one uninterruptible non-periodic power-save notification in addition to a periodic power-save notification for each of the plurality of power-save modes that is entered based on a load condition and a low-battery condition.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A wireless communication device comprising:
a transceiver having control logic to detect traffic conditions for a communication group and to enter different power-save modes for different traffic conditions,
wherein the control logic is configured to advertize a first power-save mode to the communication group in response to a first detected traffic condition, to advertize a second power-save mode to the communication group in response to a second detected traffic condition, and to advertize a third power-save mode to the communication group in response to a third detected traffic condition,
wherein the first power-save mode, the second power-save mode, and the third power-save mode comprises selectively advertising a periodic power-save notification, an interruptible non-periodic power-save notification, and an uninterruptible non-periodic power-save notification, and
wherein the uninterruptible non-periodic power-save notification is applied during a beacon interval in addition to a periodic power-save notification based on an estimated load condition and a low-battery condition.

2. The wireless communication device of claim 1, wherein the first detected traffic condition is an idle load condition and wherein the first power-save mode comprises advertising a periodic power-save notification at a predetermined interval set to a beacon interval and having a power-save duration corresponding to the idle load condition.

3. The wireless communication device of claim 1, wherein the second detected traffic condition is a bursty load condition and wherein the second power-save mode comprises advertising a periodic power-save notification having a predetermined period that is less than a beacon interval and having a power-save duration corresponding to the bursty load condition.

4. The wireless communication device of claim 1, wherein the third detected traffic condition is a periodic load condition and wherein the third power-save mode comprises advertising a periodic power-save notification having a predetermined period that is less than a beacon interval and having a power-save duration corresponding to the periodic load condition.

5. The wireless communication device of claim 1, wherein the control logic is configured to advertize a fourth power-save mode to the communication group in response to a fourth detected traffic condition, wherein the fourth detected traffic condition is a mixed bursty and periodic load condition and wherein the fourth power-save mode comprises advertising a periodic power-save notification having a predetermined period that is less than a beacon interval and having a power-save duration corresponding to the mixed bursty and periodic load condition.

6. The wireless communication device of claim 1, wherein the interruptible non-periodic power-save notification is advertised during a beacon inter-arrival time period in addition to a periodic power-save notification based on an estimated load condition.

7. A wireless communication device comprising:
a transceiver having control logic to detect traffic conditions for a communication group and to enter different power-save modes for different traffic conditions,
wherein the control logic is configured to advertize a first power-save mode to the communication group in response to a first detected traffic condition, to advertize a second power-save mode to the communication group in response to a second detected traffic condition, and to advertize a third power-save mode to the communication group in response to a third detected traffic condition, and
wherein the wireless communication device operates a group owner of a Wi-Fi Direct group, and wherein an opportunistic power-save notification and a periodic notice of absence notification are advertized differently for the different power-save modes, and wherein a non-periodic notice of absence notification replaces the opportunistic power-save notification for different power-save modes during a low-battery condition.

8. A method for a wireless communication device comprising:
detecting, by a transceiver, a traffic condition for a communication group;
entering, by the transceiver, one of a plurality of different power-save modes based on the detected traffic condition;
selectively adding at least one uninterruptible non-periodic power-save notification in addition to a periodic power-save notification for each of the plurality of power-save modes that is entered based on a load condition and a low-battery condition; and
advertising, by the transceiver, power-save notifications to the communication group for each of the plurality of power-save modes that is entered, wherein the advertising of power-save notifications varies for each of the entered plurality of power-save modes.

9. The method of claim 8, further comprising setting a periodic interval for advertising power-save notifications associated with an idle traffic mode based on a beacon interval and setting a power-save duration for each advertised notification of the idle traffic mode based on an idle load condition.

10. The method of claim 8, further comprising setting a periodic interval for advertising power-save notifications associated with a bursty traffic mode at less than a beacon interval and setting a power-save duration for each advertised notification of the bursty traffic mode based on a bursty load condition.

11. The method of claim 8, further comprising setting a periodic interval for advertising power-save notifications associated with a periodic traffic mode at less than a beacon interval and setting a power-save duration for each advertised notification of the periodic traffic mode based on a periodic load condition.

12. The method of claim 8, further comprising setting a periodic interval for advertising power-save notifications associated with a mixed bursty and periodic traffic mode at less than a beacon interval and setting a power-save duration for each advertised notification of the mixed bursty and periodic traffic mode based on a mixed bursty and periodic load condition.

13. A transceiver comprising:
control logic configured to detect traffic conditions for an established Wi-Fi Direct group,
wherein the control logic is configured to advertise to clients of the established Wi-Fi Direct group opportunistic power-save notifications and periodic notice of absence notifications based on the detected traffic conditions, and
wherein the control logic is furthered configured to advertise opportunistic power-save notifications in addition to a periodic power-save notifications during a bursty traffic power-save mode or a periodic traffic power-save mode based on load conditions and to replace opportunistic power-save notifications with non-periodic notice of absence notification based on a low-battery condition.

14. The transceiver of claim 13, wherein the control logic is configured to set a periodic interval for advertising periodic notice of absence notifications based on a beacon interval and to set a power-save duration for each periodic notice of absence based on an idle load condition.

15. The transceiver of claim 13, wherein the control logic is configured to set a periodic interval for advertising periodic notice of absence notifications at less than a beacon interval and to set a power-save duration for each periodic notice of absence based on at least one of a bursty load condition and a periodic condition.

* * * * *